(No Model.) 2 Sheets—Sheet 1.
W. S. BARSTOW & R. LINDSAY.
AUTOMATIC ELECTRIC SWITCH.
No. 561,958. Patented June 16, 1896.
Fig. 1,
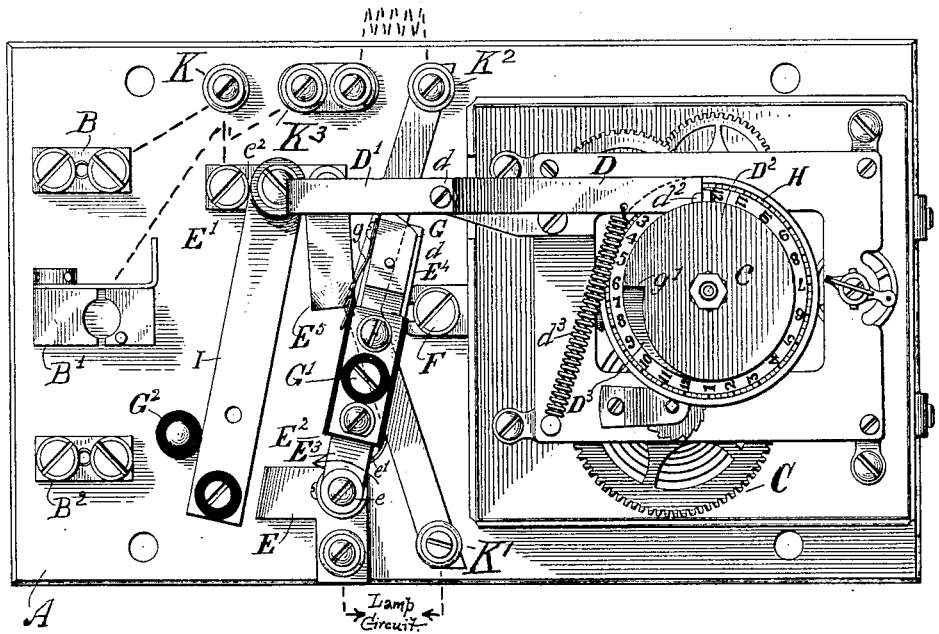
Fig. 2,
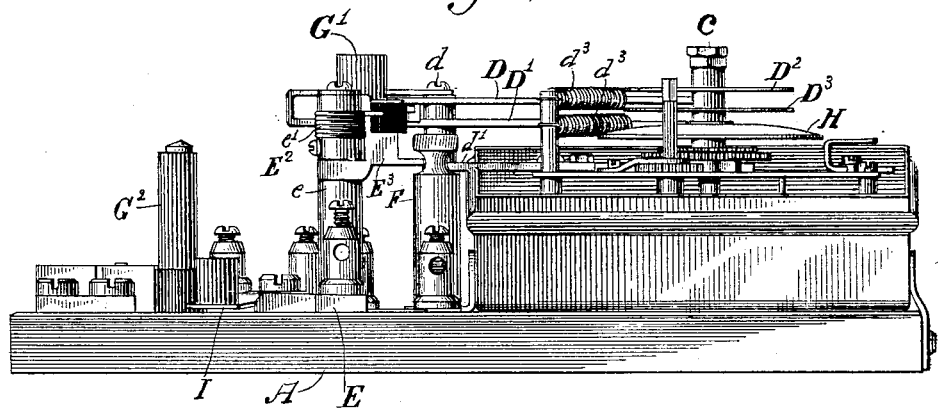
Witnesses:
O. H. Hayward
Pierson L. Wells
Inventors:
William S. Barstow and
Robert Lindsay
By Edwin H. Brown
Their Attorney
ANDREW H. GRAHAM, PHOTO-LITHO, WASHINGTON, D.C.

(No Model.) 2 Sheets—Sheet 2.

W. S. BARSTOW & R. LINDSAY.
AUTOMATIC ELECTRIC SWITCH.

No. 561,958. Patented June 16, 1896.

Witnesses:-
D. N. Rayford
Pierson L. Wells

Inventors:
William S. Barstow and Robert Lindsay
By Edwin H. Brown
Their Attorney

ANDREW B GRAHAM PHOTO-LITHO. WASHINGTON D.C.

UNITED STATES PATENT OFFICE.

WILLIAM S. BARSTOW, OF BROOKLYN, NEW YORK, AND ROBERT LINDSAY, OF CLEVELAND, OHIO.

AUTOMATIC ELECTRIC SWITCH.

SPECIFICATION forming part of Letters Patent No. 561,958, dated June 16, 1896.

Application filed June 5, 1895. Serial No. 551,710. (No model.)

*To all whom it may concern:*

Be it known that we, WILLIAM S. BARSTOW, of Brooklyn, in the county of Kings and State of New York, and ROBERT LINDSAY, of Cleveland, in the county of Cuyahoga and State of Ohio, have invented a certain new and useful Improvement in Automatic Electric Switches, of which the following is a specification.

Our invention relates to electric switches whose movable parts are controlled in their movements by a suitable motor to establish or break the continuity of the electric circuit in which the switch is interposed.

We will describe an automatic electric switch embodying our improvement, and then point out the novel features in the claims.

Figure 3:
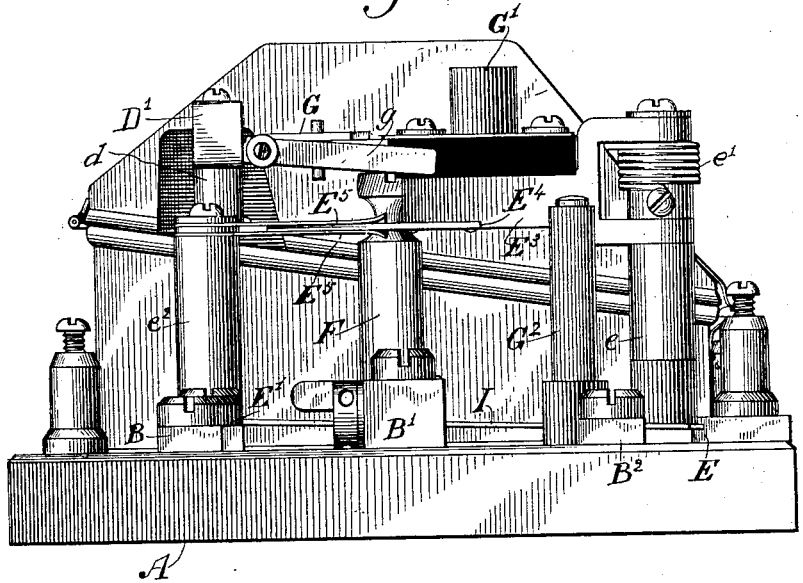
Figure 4:
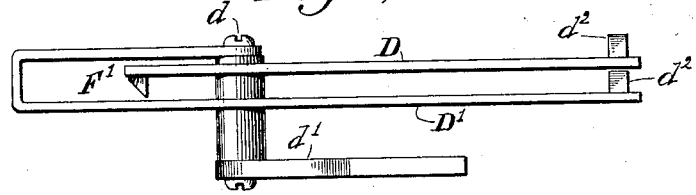
Figure 5:
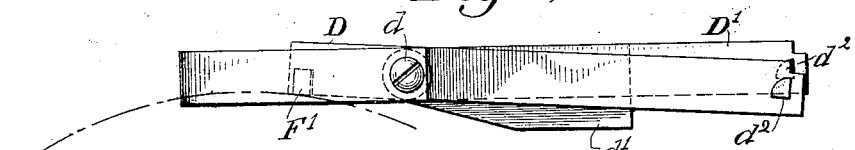
Figure 6:
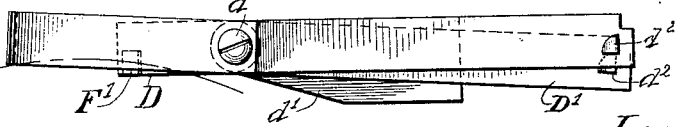

In the accompanying drawings, Figure 1 is a plan view of an automatic electric switch embodying our improvement. Fig. 2 is a side elevation thereof. Fig. 3 is an end elevation of the same. Fig. 4 is a side elevation of a pair of controlling-arms embodied in the improvement. Figs. 5 and 6 are plan views of the same, showing them in different relative positions which they assume during their movements.

Similar letters of reference designate corresponding parts in all figures.

A is the base-block of the switch. It will preferably be of some non-conducting fireproof material—such as slate, for instance.

The switch we have chosen for illustration is adapted to be used for switching in and off, at fixed times, a street-lamp, which is operated in parallel or multiple arc from street mains or conductors, permitting the lamp to burn for a fixed interval and then extinguishing it, even though the mains are energized for the twenty-four hours. It is not, of course, confined to this particular use, but may be utilized where the same or similar conditions arise. If the system employed is the three-wire system, there may be provided three terminals or binding-posts B B' B², the first and last of which communicate with the plus and minus conductors, and the binding-post B' with the middle or neutral wire.

C is the motor for actuating the switch. It consists of a clockwork with the usual driving-spring and intermediate gearing for actuating the spindle $c$.

D D' are levers for controlling the movement of the switch. These levers are pivoted to a common stud $d$, erected upon a bracket $d'$, secured to the frame of the clockwork C. The ends of levers D D' adjacent to the spindle $c$ are each provided with a pin or stud $d^2$, which bears upon the periphery of a cam $D^2$ or $D^3$, held friction-tight upon the spindle $c$ of the clockwork and driven thereby. A spring $d^3$ is attached to each lever D and D' to hold the studs $d^2$ in engagement with the edges of the cams $D^2$ and $D^3$, the opposite ends of the springs being secured to the frame of the clockwork.

E and E' are metallic blocks secured to the base-block A and carrying the members of the switch $E^2$.

$E^3$ is a switch-arm pivoted to a post $e$, carried by the block E, and urged toward the left by a spring $e'$, coiled around the post, one end of the spring being secured to the post, while the opposite end bears against the switch-arm.

$E^4$ is the blade of the switch, adapted to pass between and contact with two spring-tongues $E^5$, which are secured to the upper end of a post $e^2$, carried by the block E'.

F is a stop for limiting the movement of the switch-arm as it is swung upon its fulcrum-point against the resistance of spring $e'$.

The arm of the lever D, which extends to the left of its fulcrum-point, is shorter than the corresponding arm of the lever D' and is provided with a detent F', which is adapted to engage with and prevent the movement of the switch-arm $E^3$ under the influence of the spring $e'$. When the detent F' is in engagement with the switch-arm $E^3$, the blade $E^4$ of the switch will be disengaged from the spring-tongues $E^5$. The outer arm of the lever D' is also so constructed as to engage with the switch-arm $E^3$. It may be provided with a detent similar to that carried by the lever D, but the detent may be formed by bending the arm itself at the end thereof at right angles to itself. When the switch-arm $E^3$ and the arm of the lever D' are in engagement, the blade $E^4$ will be in engagement with the spring-tongues $E^5$, and electrical continuity through the switch will be established.

In order to permit the switch-arm $E^3$ to be swung upon its fulcrum-point backward against the resistance of the spring $e'$ when the engaging-arms of the levers D and D' are interposed in the path, the engaging end of the switch-arm will be in the form of a pivoted dog G, so connected to the switch-arm that it may be swung upon its pivot when carried to the right against the engaging-pieces carried by the arms of levers D or D'. The construction will be such, however, that when the arm is swung forward and then released and the dog abuts against the engaging-pieces carried by the arms of the levers D D' stops or lugs provided on the arm and the dog will abut against each other and prevent any further movement of the dog. A spring $g$, secured at one end to the arm $E^3$, bears at its opposite end against the dog to bring the stops into engagement.

$G'$ is an insulated finger-piece by which the switch-arm may be manipulated, and $G^2$ is a stop, preferably cushioned, against which the arm strikes when released from the levers D and D'.

The cams $D^2$ and $D^3$ are disks provided each with a notch $g'$. When either stud $d^2$ is at the outer periphery of the corresponding cam $D^2$ or $D^3$, the opposite ends of the levers D and D' will protrude into the path of the extremity of the dog G, while when the studs are at the bottoms of the notches the ends of those levers are thrown out of the path of the dog. As before mentioned, these cams are attached to and driven by the spindle $c$ of the clockwork. They engage with the spindle by friction merely, and may therefore be readily adjusted relatively to each other. H is an index for facilitating this adjustment and having its outer edge divided into spaces representing hours, minutes, &c. Cam $D^2$, operating lever D, is placed in advance of the other cam and with its notch over a division which corresponds to the hour at which it is desired the lamp shall be lighted. Cam $D^3$, operating the arm D', is placed backward relatively to the cam $D^2$ to such an extent as corresponds to the interval during which the lamp is to burn. It is evident from the description given that, assuming the switch-arm to be in its normal or farthest position to the right, that by the continued movement of the clockwork the lamp will first be automatically lighted, so maintained for a determined interval of time, and then automatically extinguished.

I is a switch-lever for temporarily connecting the metallic blocks E and E' when the continuity through the switch-arm $E^3$ is broken.

The binding-post terminals and the various circuits extending from one to the other may be designated and described as follows: From the binding-post B the circuit leads directly to the binding-post K, and from thence to the block E'. From E' the circuit passes through the switch to the block E, between which latter and the binding-post K' is included the circuit embracing the lamp. The binding-post K' is connected with the binding-post $K^2$, between which latter and the binding-post $K^3$ the circuit extends through a suitable regulating resistance. The binding-post $K^3$ is in the present instance in electrical communication with the neutral binding-post B'.

A switch of this kind and for this purpose will offer especial advantages. Where there are a number of lamps operated from the same circuit, the lamps being situated a considerable distance from each other, as is the case with street-lamps, it would require a large number of employees to pass from lamp to lamp to switch on the same in the short space of time in which the lamps can be lighted and within which they must all be lighted.

By arranging a switch of this kind, which communicates with the street-mains and from which the circuit for one or more lamps extends in proximity to the lamp—as, for instance, in the base of the lamp-post—the lamp or lamps may be automatically lighted and extinguished without any attention from an employee. The swinging back of the switch-arm to its normal position may be done each day by the lamp-cleaner.

Having described our invention, what we consider as new, and desire to secure by Letters Patent, is—

1. The combination with a suitable mechanical motor, of a switch comprising a switch-arm and an opposite member or contact-piece, a spring for impelling the switch-arm, a stop for holding the switch-arm normally away from the opposite member of the switch, a stop for holding the switch-arm in engagement with said member, and means under the control of the motor for moving said stops and permitting the movement of the switch-arm, substantially as specified.

2. The combination, with the driven shaft of a motor, of notched disks or cams driven thereby, a switch-arm controlling the continuity of an electric circuit and movable upon its support, a spring for moving the switch-arm and stops controlled by the movement of said disks for determining the position of the switch-arm, substantially as specified.

3. The combination with the driven shaft of a motor, of notched disks or cams driven thereby, a switch-arm controlling the continuity of an electric circuit and movable upon its support, and pivoted levers engaging with said disks at one end and provided with stops at the opposite ends determining the position of the switch-arm, substantially as specified.

4. The combination of a motor, a notched disk or cam driven therefrom, a pivoted switch-arm controlling the continuity of an electric circuit, a pivoted lever engaging with said disk at one end and provided with a stop at the opposite end for determining one position of the switch and means operated from the motor for determining another position of the switch, substantially as specified.

5. A switch for making and breaking a lamp-circuit connected in multiple arc to feeding-mains, comprising a motor, a shaft driven therefrom, notched disks or cams fitted to said shaft in a manner to be adjustable thereon, independently of the shaft and of each other, pivoted levers each of which at one end engages with a cam or notched disk, a switch-arm controlling the continuity of the electric circuit and movable upon its support, and stops provided upon said levers for determining the off and on positions of the switch, substantially as specified.

In testimony whereof we have signed our names to this specification in the presence of two subscribing witnesses.

WILLIAM S. BARSTOW.
ROBERT LINDSAY.

Witnesses as to William S. Barstow:
W. W. FREEMAN,
A. N. NEILSEN.

Witnesses as to Robert Lindsay:
CHARLES W. MILLS,
SAML. SCOVIL.